United States Patent
Matsuo et al.

(10) Patent No.: US 8,315,979 B2
(45) Date of Patent: Nov. 20, 2012

(54) NODE DEVICE, INFORMATION COMMUNICATION SYSTEM, METHOD FOR RETRIEVING CONTENT DATA, AND COMPUTER READABLE MEDIUM

(75) Inventors: Hideki Matsuo, Nagoya (JP); Kazuhiro Nakamura, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 330 days.

(21) Appl. No.: 12/732,785

(22) Filed: Mar. 26, 2010

(65) Prior Publication Data

US 2010/0250594 A1    Sep. 30, 2010

(30) Foreign Application Priority Data

Mar. 31, 2009   (JP) .................... 2009-087907

(51) Int. Cl.
   *G06F 7/06* (2006.01)
(52) U.S. Cl. ...................... 707/622; 709/201
(58) Field of Classification Search .......... 707/622
    See application file for complete search history.

(56) References Cited

U.S. PATENT DOCUMENTS

| | | | | |
|---|---|---|---|---|
| 4,914,571 A * | 4/1990 | Baratz et al. ................. | 1/1 |
| 5,974,409 A * | 10/1999 | Sanu et al. ................. | 1/1 |
| 7,839,867 B2 * | 11/2010 | Matsuo et al. ............... | 370/400 |
| 7,881,223 B2 * | 2/2011 | Shim et al. .................. | 370/254 |
| 8,103,757 B2 * | 1/2012 | Kakuta et al. ................ | 709/223 |
| 8,126,845 B2 * | 2/2012 | Freedman ..................... | 707/621 |
| 8,130,676 B2 * | 3/2012 | Shim et al. .................. | 370/254 |
| 8,145,698 B1 * | 3/2012 | Kaufman et al. .............. | 709/201 |
| 8,195,764 B2 * | 6/2012 | Kiyohara et al. ............. | 709/217 |
| 2002/0094787 A1 * | 7/2002 | Avnet et al. ................. | 455/68 |
| 2007/0230482 A1 * | 10/2007 | Shim et al. .................. | 370/400 |
| 2007/0283043 A1 * | 12/2007 | Kiyohara et al. ............. | 709/243 |
| 2007/0297422 A1 * | 12/2007 | Matsuo et al. ............... | 370/400 |
| 2008/0126360 A1 * | 5/2008 | Kakuta et al. ................ | 707/10 |
| 2008/0164306 A1 * | 7/2008 | Gu ............................ | 235/379 |
| 2008/0168072 A1 * | 7/2008 | Freedman ..................... | 707/100 |
| 2008/0235321 A1 * | 9/2008 | Matsuo ....................... | 709/201 |
| 2009/0037445 A1 * | 2/2009 | Ushiyama ..................... | 707/100 |
| 2009/0119681 A1 * | 5/2009 | Bhogal et al. ................ | 719/318 |
| 2010/0211544 A1 * | 8/2010 | Chen et al. .................. | 707/622 |
| 2010/0325089 A1 * | 12/2010 | Hopkins ...................... | 707/622 |
| 2011/0004584 A1 * | 1/2011 | Goyal et al. ................. | 707/622 |
| 2011/0060843 A1 * | 3/2011 | Shim et al. .................. | 709/238 |

FOREIGN PATENT DOCUMENTS

JP    2007-280303 A    10/2007

* cited by examiner

*Primary Examiner* — Hung Q Pham
*Assistant Examiner* — Hubert Cheung
(74) *Attorney, Agent, or Firm* — Baker Botts L.L.P.

(57) ABSTRACT

A node device connected to other node devices has a particular obtaining unit that obtains search information including, a first determination unit that applies a predetermined rule to determine whether the search information obtained by the particular obtaining unit is required to be stored in the node device. The node device has a first storage unit that stores search information when required, and a second determination unit that determines whether the search information obtained by the particular obtaining unit is newly published in the network. A second storage unit stores the search information when the second determination unit determines that the storage information is newly published. A search unit searches the content data, based on the search information stored in at least one of the first storage unit and the second storage unit.

16 Claims, 9 Drawing Sheets

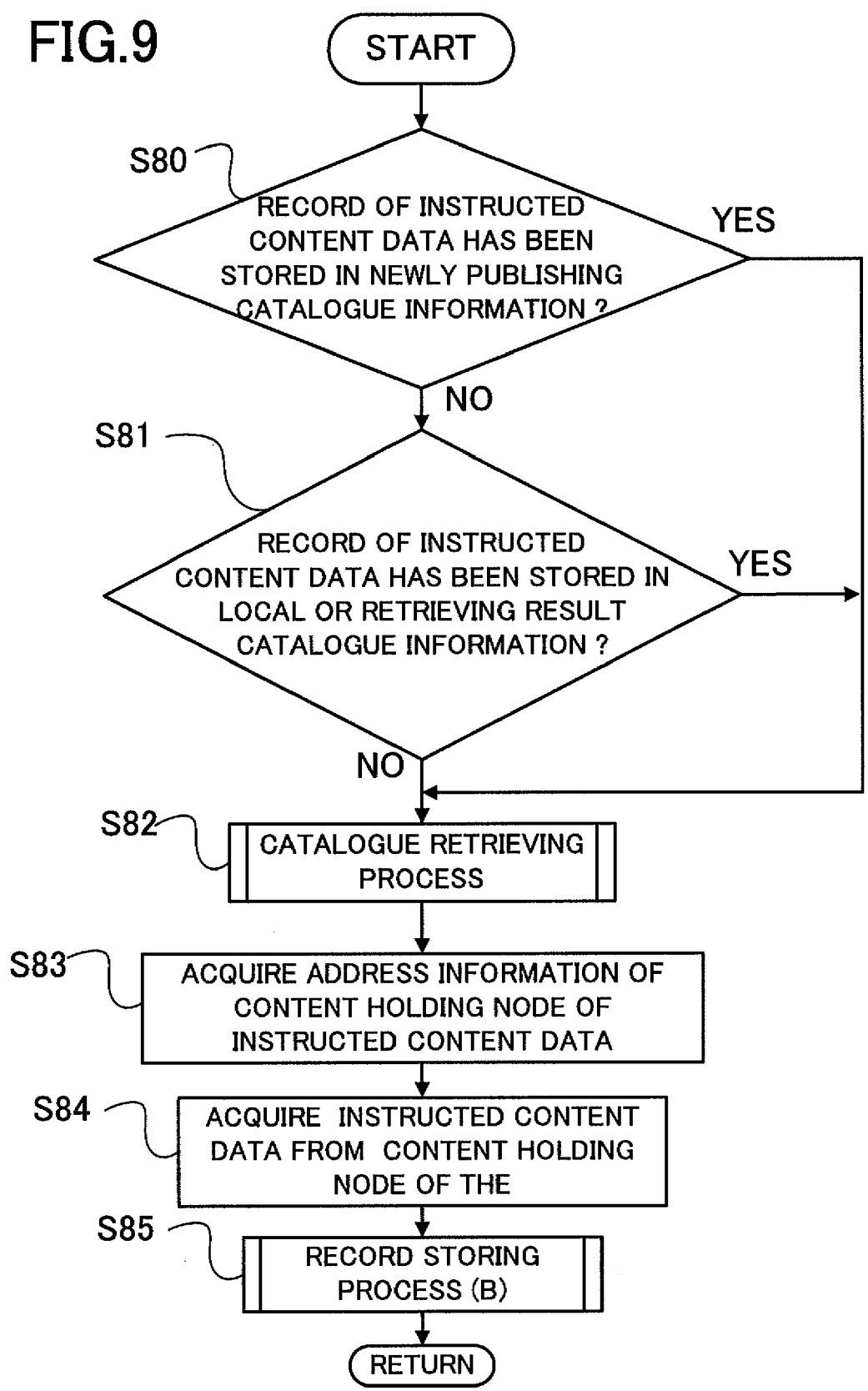

NODE DEVICE, INFORMATION COMMUNICATION SYSTEM, METHOD FOR RETRIEVING CONTENT DATA, AND COMPUTER READABLE MEDIUM

CROSS REFERENCE TO RELATED APPLICATION

This application claims priority from Japanese Patent Application No. 2009-087907 filed on Mar. 31, 2009, the entire contents of which are incorporated herein by reference.

BACKGROUND OF THE INVENTION

1. Field of the Invention

The present invention relates to an information communication system of Peer to Peer type. The Peer to Peer type system comprises a plurality of node devices which are capable of communicating with each other via a network. In particular, the invention relates to an information communication system in which the node devices store a plurality of content data in a distributed manner.

2. Description of Related Art

Generally, the above-mentioned system comprises a plurality of node devices, which store a plurality of content data in the distributed manner. It has been proposed that each node device in the system which obtains from the other node devices and stores content catalogue information. The content catalogue information includes attribute information of each content data. The content catalogue information is utilized to search desired content data. The attribute information, for example, includes a title of content data, a content category, or a name of an artist of content data. Each node device obtains the content catalogue information. And each node device is capable of obtaining desired content data, based on the attribute information in the content catalogue information. The content catalogue information is shared with the plurality of node devices.

SUMMARY OF THE INVENTION

It has been proposed that each node device stores the content catalogue information distributed to each node device based on a predetermined rule. Each node device requires searching the distributed catalogue information among the node devices in the system. That is, each node device executes searching by making use of content catalogue information, which is shared among node devices.

Generally, newly published content data is requested by a large number of node devices. The same search method as described above is applied, when the newly published content data is searched by the node device. However, each node device stores the predetermined attribute information of the content data which each node device requested. That is, a large number of node devices request the newly published content data, as soon as the newly published content data is published in the network. A large number of the requests cause the network burden to increase when executing search requests of catalogue information to a specific node device via the network.

In an embodiment of the invention, a node device is configured to communicate with a plurality of node devices, wherein content data is stored in at least one node device and the content data is accessible from the plurality of node devices, wherein the node devices are connected via a network as part of an information communication system. The node device comprises a particular obtaining unit configured to obtain search information for searching the content data stored in the node device, the search information comprising publication time information corresponding to a time the content data was published in the network, a first determination unit configured to apply a predetermined rule to determine whether the search information obtained by the particular obtaining unit is required to be stored in the node device, a first storage unit configured to store the search information when the first determination unit determines that the search information is required to be stored, a second determination unit configured to determine whether the search information obtained by the particular obtaining unit is newly published in the network, based on the publication time information retrieved from the obtained search information, a second storage unit configured to store the search information when the second determination unit determines that the storage information is newly published, and a search unit configured to search the content data, based on the search information stored in at least one of the first storage unit and the second storage unit.

In another embodiment of the invention, a computer program product comprises a computer readable medium having computer readable instructions stored thereon, the computer readable instructions configured to be exected as a computer program for causing a computer to function as a node device that communicates with a plurality of node devices connected via a network as part of an information communication system. The computer functioning as the node device comprises a particular obtaining unit configured to obtain search information for searching the content data stored in the node device, the search information comprising publication time information corresponding to a time the content data was published in the network, a first determination unit configured to apply a predetermined rule to determine whether the search information obtained by the particular obtaining unit is required to be stored in the node device, a first storage unit configured to store the search information when the first determination unit determines that the search information is required to be stored, a second determination unit configured to determine whether the search information obtained by the particular obtaining unit is newly published in the network, based on the publication time information retrieved from the obtained search information, a second storage unit configured to store the search information when the second determination unit determines that the storage information is newly published, and a search unit configured to search the content data, based on the search information stored in at least one of the first storage unit and the second storage unit.

In yet another embodiment of the invention, a computer program product comprises a computer readable medium having computer readable instructions stored thereon, the computer readable instructions configured to be exected by the computer equipped in at least one node device of a plurality of node devices connected via a network in an information communication system in which content data is stored in at least one node device and is accessible from the other of the plurality of node devices. The computer program causes the computer to perform steps comprising a first obtaining step of obtaining search information for searching the content data stored in at least one node device, the search information comprising publication time information corresponding to a time the content data was published, a first determining step of applying a predetermined rule to determine whether the obtained search information is required to be stored in the node device, a first storing step of storing the search information in a first storage unit when the first determination step determines that the obtained search information is required to be stored, a second determining step of determining whether the obtained search information by the particular obtaining unit is newly published, based on the publication time information retrieved from the obtained search information, a second storing step of storing the search information in a second storage unit, when the storage information is determined to be newly published at the second determination step, and a searching step of searching the content data, based on the search information stored in at least one of the first storage unit and the second storage unit.

In still yet another embodiment of the invention, a method for retrieving content data in an information communication system in which a plurality of node devices are connected via a network and communicate with each other, content data being stored in at least one node device and being accessible from the other node devices, comprises a first obtaining step of obtaining search information for searching the content data stored in at least one node device, the search information comprising publication time information corresponding to a time the content data was published, a first determining step of applying a predetermined rule to determine whether the obtained search information is required to be stored in the node device, a first storing step of storing the search information in a first storage unit when the first determination step determines that the obtained search information is required to be stored, a second determining step of determining whether the obtained search information by the particular obtaining unit is newly published, based on the publication time information retrieved from the obtained search information, a second storing step of storing the search information in a second storage unit, when the storage information is determined to be newly published at the second determination step, and a searching step of searching the content data, based on the search information stored in at least one of the first storage unit and the second storage unit.

BRIEF DESCRIPTION OF THE DRAWINGS

FIG. 9 shows a flow chart of "pre-storing process" in the step S69;

DETAILED DESCRIPTION OF EMBODIMENTS OF THE INVENTION

Hereinafter, exemplary embodiments of the present invention will be described with reference to the drawings. In the exemplary embodiments, a case in which the present invention is applied to a content distribution storage system is described.

1. Configuration and Operation of Content Distribution Storage System)

At first, the configuration and operation of a content distribution storage system will be described with reference to FIG. 1.

Figure 1:
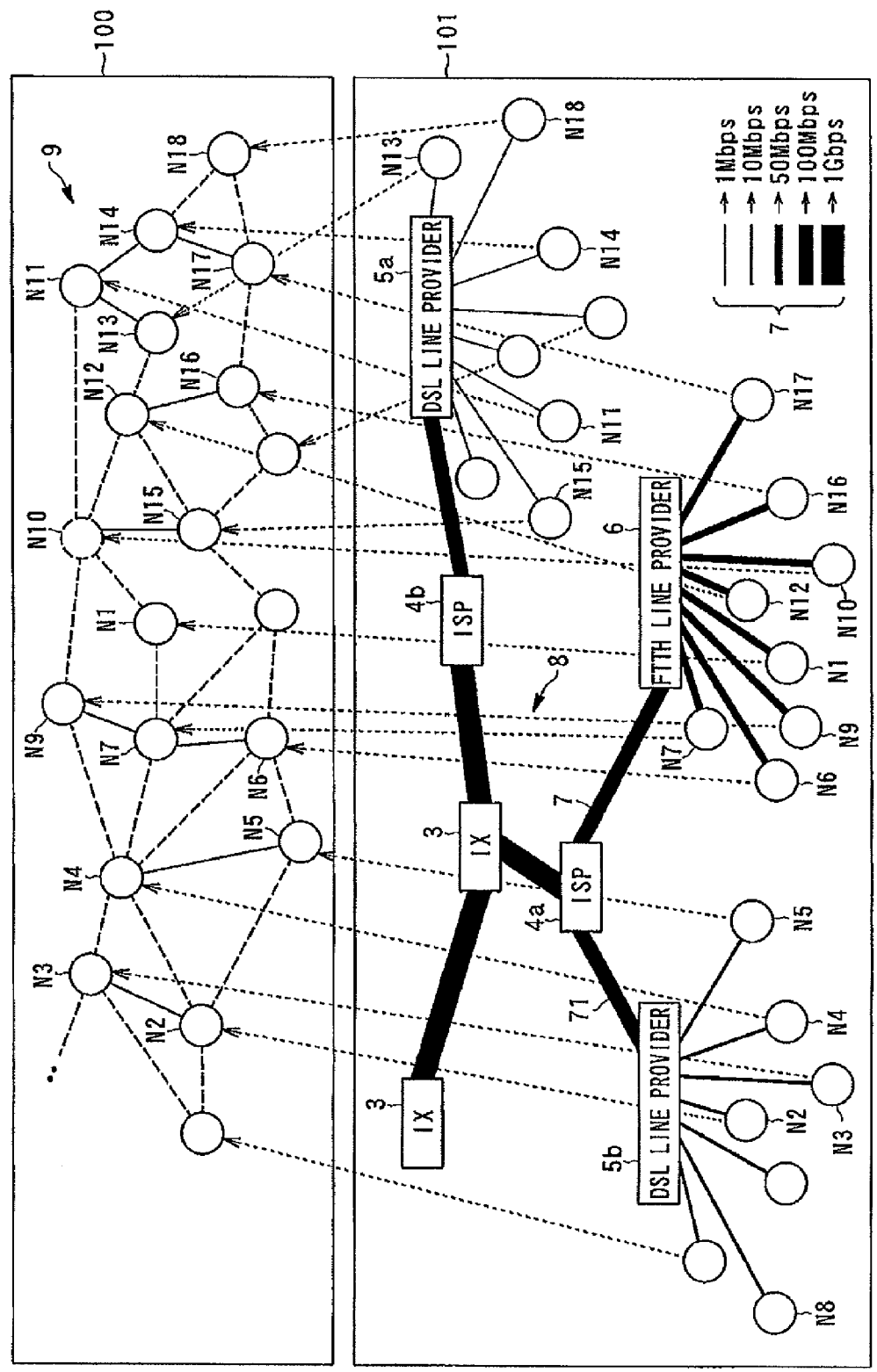
FIG. 1 shows an example of a configuration that a plurality of node devices are connected in the content distribution storage system according to the first exemplary embodiment.

FIG. 1 shows an example of the configuration that a plurality of node devices are connected in the content distribution storage system.

In a concrete configuration FIG. 101 shown in FIG. 1, a network 8 such as the Internet includes an internet exchange (IX) 3, internet service providers (ISPs) 4a and 4b, devices 5a and 5b of digital-subscriber-line providers (DSL), a device 6 of a fiber-to-the home provider (FTTH), and a communication line 7, e.g., a telephone line, an optical cable, and the like. Although not shown, routers for transferring data or packets are connected in the network 8 of the example shown in FIG. 1 as necessary.

A plurality of node devices Nn (n=1, 2, 3, ... ) are connected to the network 8. The node device is also referred to as "node." Each of the nodes Nn is assigned a unique manufacturing number and an IP (Internet Protocol) address.

In conceptual configuration FIG. 100 shown in FIG. 1, a content distribution storage system S of this exemplary embodiment is a peer-to-peer network system. The peer-to-peer network system is made by connecting any nodes of the plurality of nodes Nn.

A network 8 provided in the conceptual configuration FIG. 100 shown in FIG. 1 is an overlay network configuring a virtual link made by a use of an existing network 8. That is, the overlay network 9 is a logical network. The overlay network 9 is implemented by a specific algorithm, for example, an algorithm utilizing a distributed hash table (hereinafter referred to as DHT). Each of the nodes Nn participating in the overlay network 9, i.e., the content distribution storage system S, is assigned a node ID as identification information containing a given number, e.g., predetermined number of digits. The identification information may be unique to each node Nn. In this exemplary embodiment, a connection of a node Nn to the peer-to-peer network is referred to as "a participation in the peer-to-peer network." The node ID is one of the examples of node identification information.

For example, the node ID is a hash value obtained by hashing a unique number assigned to each node Nn such as an IP address or a manufacturing number by a common Hash function. The Hash function is an SHA-1, or the like. The hashed value has a bit length of 160 bits. The node IDs are uniformly distributed in a single ID space.

Each node Nn holds a routing table using the DHT. The routing table specifies destinations of respective messages in the content distribution storage system S. Specifically, a node Nn which is appropriately spaced in the ID space is determined. Pluralities of sets of node information are registered in the routing table. Each of the sets of node information includes a node ID, an IP address, and a port number of the determined node Nn.

An example of the routing table using such the DHT is described, for example, in US Patent Application Publication No. 2007/0283043 A1, issued as U.S. Pat. No. 8,195,764 B2, on Jun. 5, 2012, the entire contents of which are incorporated herein by reference.

As described in US Patent Application Publication No. 2007/0283043 A1, issued as U.S. Pat. No. 8,195,764 B2, on Jun. 5, 2012, the content distribution storage system S stores replicas in a plurality of nodes Nn in a distributed manner. The replicas are sets of data corresponding to replication of various contents of different substances, e.g., a movie, music, and the like. The replicas are stored in a given file format. A single replica may be divided and stored in the plurality of nodes Nn. A replica of content is hereinafter referred to as a "replica" or "content data".

Each of the replicas is available among the plurality of nodes Nn. For example, a node N5 stores a replica of content about a movie having a title XXX, whilst a node N3 stores a replica of content about a movie having a title YYY. As described above, the replicas are stored in the plurality of nodes Nn in a distributed manner. A node Nn storing a replica is hereinafter referred to as a "content-holding node."

Information, such as a content name (title) and a content ID (unique identification information) for each content, is added to each of the replica of the content. The content ID may be unique to each of the replica. The content ID is one of the examples of content identification information. The content ID is generated, for example, by hashing a content name and an arbitrary numeral by a Hash function. The Hash function used herein is the Hash function common to the Hash function for obtaining the node ID. The generated content ID is arranged in the same ID space where the node ID belongs. An arbitrary numeral is, for example, several first bytes of content data. Alternatively, a system manager may give a unique ID value to each content. The content ID to be given has the same bit length as that of the node ID. An example of the ID space is described, for example, in US Patent Application Publication No. 2009/037445 A1, the entire contents of which are incorporated herein by reference.

Locations of the replicas of the contents stored in the distributed manner are stored and managed by one or more nodes Nn. In the exemplary embodiment, information including a combination of node information about a node Nn storing the replica of the content and the content ID of the corresponding content, or the like is included in index information. A node Nn that manages the location of the replica of the content is referred to as a "root node" or a "root node of content or content ID." The index information is stored in and managed by the root node. The index information is stored in an index cache.

In this embodiment, content catalogue information is delivered to all of the nodes Nn. The content catalogue information is information including a correspondence between a content name and the content ID. When a user requires obtaining content data, first, the user obtains content ID. The node device which is required to obtain content data by the user is hereinafter referred to as a "user node." The user node obtains the content ID by referring the content catalogue information.

The content catalogue information is transferred to the node Nn using multi-cast transfer technology by a management server. The management server manages the content distribution storage system S.

The user node generates a search message (query) which includes the obtained content ID. The search message is indicative of searching the content-holding node whose content ID is included in the search message. The user node sends the generated query to the root node based on a routing table. The user node has the root node send address information of the content-holding node to the user node. The user node has access to the content-holding node based on the address information. The user node sends a content transfer request message to the content-holding node, and the content-holding node sends the content data to the user node. The user node also may send the content transfer request message to the content-holding node, and may download the content data from content-holding node. An example of the routing table using such DHT and a method of transferring a message among the node devices are described, for example, in US Patent Application Publication No. 2009/037445 A1, the entire contents of which are incorporated herein by reference.

The catalogue information includes a record. The record is one example of search information of content.

The record is attribute information of the content data. For example, the attribute information is such as the content ID, publication time information, a keyword, evaluated value, a title of the content, a category, an artist, a performer, a name of a director. The publication time information means a period of publishing the content data in the network. The keyword is indicative of an index of searching for content data. An example of the attribute information is described, for example, in US Patent Application Publication No. 2009/037445 A1, the entire contents of which are incorporated herein by reference.

The user decides the content data which the user requires using these records. These records are also used as the keywords for searching, when the user selects the required content data among a lot of content data. For example, if the user inputs "JAZZ" as a search keyword, the content distribution storage system S searches the content data corresponding to "JAZZ". And the search result is displayed for the user in a display device of the user node. As a result, the user can select content data in the search result. For example, the search result is indicative of displaying the searched record of content data.

Generally, when the catalogue information is delivered to each node, the node stores all delivered catalogue information in its own internal memory. In this case, the more the content data is inputted in the content distribution storage system S, the more content catalogue information is delivered to the nodes. There is so much delivered content catalogue information that the node can not store the delivered catalogue information in its own internal memory. In the embodiment, the catalogue information is stored among a plurality of nodes in the distributed manner. Concretely, a range of storing the content catalogue information in each node is determined based on a predetermined rule. That is, each node stores the predetermined content catalogue information. For example, each node stores the limited number of content catalogue information predetermined according to the operational capability of each node. In this embodiment, the predetermined rule is a rule of using "Range". The method of using "Range" is explained as follows.

Range" is a predetermined value in each node Nn. For example, "Range" represents the number of digit bits by which the node ID and the content ID correspond with each other from the highest order digit bit.

If "Range" equals to "1", it means at least the highest order bit of node ID corresponds with that of content ID. If "Range" equals to "2", it means at least the highest order bit and the second highest order bit of node ID correspond with those of content ID. The wider the range of storing content catalogue information is, the bigger "Range" is.

Each node stores the "Range" described above in its own internal memory. When the node acquires the record, each node compares the content ID corresponding to the acquired record with the node ID of the node itself. If figure of the content ID in the value of "Range" high rank digit corresponds with the node ID of the node itself in the value of "Range" high rank digit, the node stores the record corresponding to the content ID in the internal memory as a range of storing. For example, when the node ID is "0132" and "Range" is "1", the node of the node ID "0132" stores at least the record of the content ID the highest digit of which is "0" as a range of storing.

For another example, when the node ID is 1001" and the value of "Range" is "2", the node of the node ID "1001" stores at least the record of the content ID the highest 2 digits of which are "10" as a range of storing. If value of "Range" is "0", the node which assigned "Range=0" stores all records.

The node does not prevent from storing the catalogue information which is not satisfied with the range of storing. The embodiment assures that the node stores at least the assigned range of storing the content catalogue information. Detailed process of receiving the catalogue information, are described, for example, in US Patent Application Publication No. 2009/037445 A1, the entire contents of which are incorporated herein by reference.

Setting the "Range" depends on each node. Each node can set a value of the "Range". For example, in the node, the larger the first storage area which stores the range of storing content catalogue information is, the bigger the value of "Range" is. If the number of digit of content ID and node ID is equal to the value of "Range", it is determined if the content ID corresponds to the node ID. In this embodiment, it may be determined if the content ID corresponds to the node ID or not. The range of storing may be determined by management server or node Nn itself or another node Nn among the record or content ID.

As described above, each node which participates in the overlay-network 9, stores the content catalogue information of the predetermined range of storing. Detailed process of receiving the catalogue information is described, for example, in US Patent Application Publication No. 2009/037445 A1, the entire contents of which are incorporated herein by reference.

In an embodiment of the invention, before the content data is published through Internet, the content data may be delivered by the management server to each node Nn which participates in the content distribution storage system S, and may be stored in the internal memory of the node Nn in preparation for using the published content data by the node Nn. The management server may transfer a pre-storing instruction message to the participating node Nn in a particular manner, e.g., a multi-cast manner. The pre-storing instruction message may instruct the node Nn, which receives the pre-storing instruction message, to store a newly published content data before the newly published content data is published, e.g., through the Internet. The pre-storing instruction message may comprise the content ID of the instructed content data. The node Nn which received the pre-storing instruction message then may retrieve a location for storing the instructed content data to be published to the Internet. Specifically, the node Nn may transfer the query, which may comprise the content ID of the instructed content data, to another node Nn.

The another node Nn which receives the pre-storing instruction message stores the retrieved content data from the content holding node storing the instructed content data. The pre-storing instruction message may be transferred to each node Nn by the management server. In order to reduce a burden of the management server, each node Nn may transfer the pre-storing instruction message to another node Nn. The node Nn which receives the pre-storing instruction message may acquire the instructed content data based on the content ID included in the pre-storing instruction message and may store the instructed content data.

In this embodiment, each node Nn stores the catalogue information which includes the record of the newly published content data. The newly published content data is stored in each node Nn before the newly published content data is published through Internet.

The newly published content data comprises information representing a difference between the present time and a time when the content data may be used in content distribution storage system S, or time when content data may be published through Internet. The newly published content data also represents that this difference is within a predetermined period. The predetermined period may be any predetermined length of time, e.g., a few hours, a few days, a week, or longer. The predetermined period may be determined by the management server or the node Nn. The predetermined period may be determined based on one or more factors, e.g. a fitness value, a sort of content data, or the number of the nodes Nn which participate in the content distribution storage system S. In an embodiment of the invention, the fitness value may be predetermined by the users, or by the viewing rate of the content data.

When a user retrieves content data by inputting a keyword or a condition, e.g., specifying a range of the publication period, to the input device, the node Nn may refer to the stored catalogue information in its internal memory before the node Nn performs a process, e.g., a catalogue retrieving process to another node Nn. The catalogue retrieving process is described in more detail herein.

The content catalogue information of the newly published content data is more likely to be requested for retrieving by the node Nn than the content catalogue information of the other type content data. Thus, as described above, each node Nn may store both the content catalogue information for the range to be stored, and also the content catalogue information of the newly published content data. When the node Nn retrieves the content catalogue information, the node Nn may refer to the stored content catalogue information of the newly published content data in its internal memory, without communicating with another node Nn, e.g., through Internet. Thus, storing the content catalogue information of the newly published content data helps to increase the speed for retrieving information.

The node Nn may store a record of the retrieved content data by the "catalogue retrieving process" in its internal memory. The retrieved content data by the "catalogue retrieving process," may be the user's favorite content data. The node Nn may refer to the stored content catalogue information of the retrieved content data as described above in its internal memory without communicating with another node Nn, e.g., through Internet, when the node Nn retrieves the content catalogue information. Similarly to as above, storing the content catalogue information of the retrieved content data helps to increase the speed for retrieving information.

As described in more detail herein, the catalogue information of the range of storing may be referred to as "local catalogue information". The catalogue information of the newly published content data may be referred to as "newly published catalogue information." The catalogue information of the retrieved content data may be referred to as "catalogue information of retrieved result."

(2. Node Nn)

The configuration and function of the node Nn is now described with reference to FIG. 2.

Figure 2:
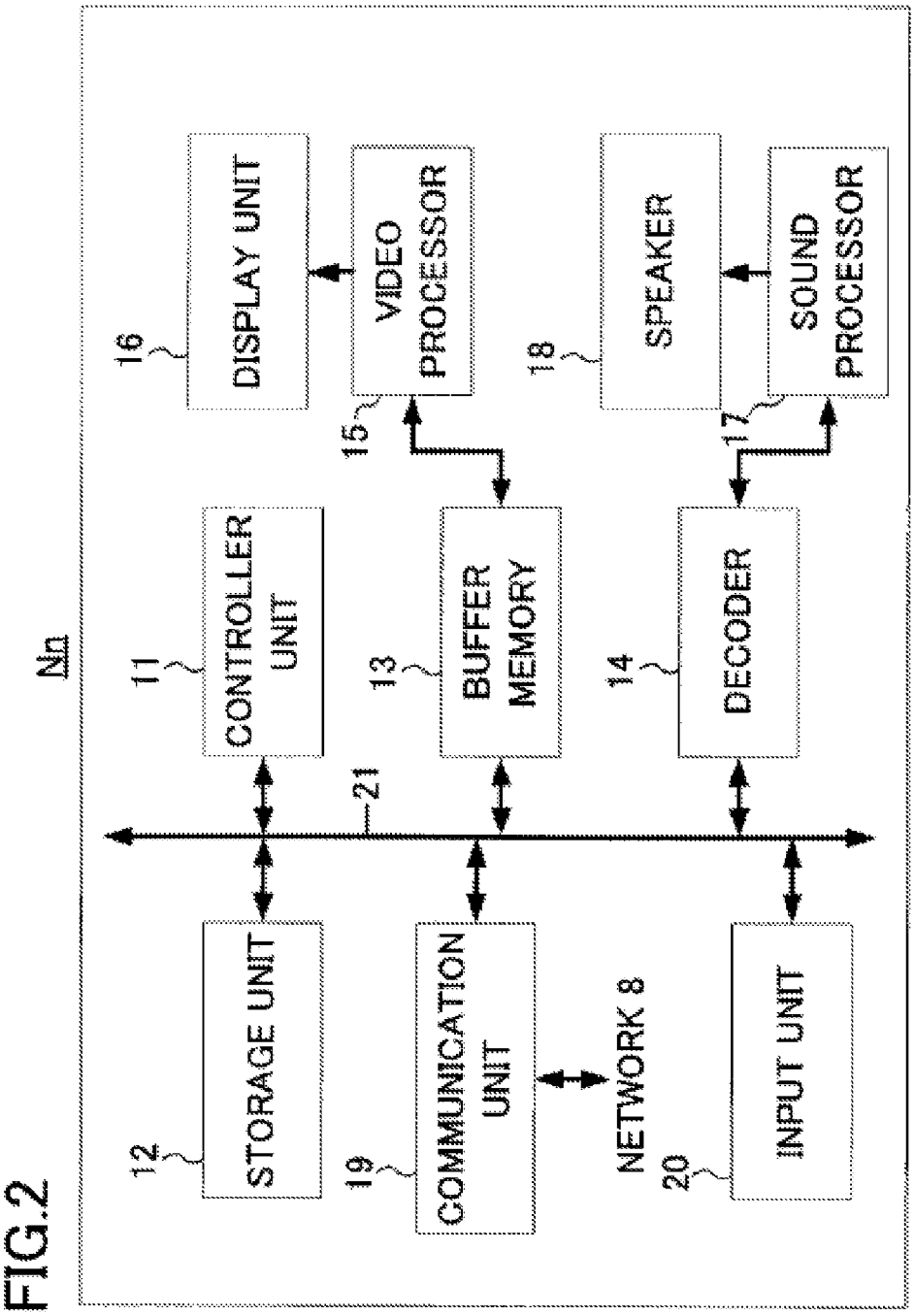
FIG. 2 is a block diagram showing a general exemplified configuration of a node device Nn.

FIG. 2 is a view showing an exemplified general configuration of the node Nn.

As shown in FIG. 2, each of the nodes Nn includes a control unit 11, a storage unit 12, a buffer memory 13, a decoder unit 14, a video processing unit 15, a display unit 16, an audio processing unit 17, a speaker 18, a communication unit 19, and an input unit 20. The control unit 11, the storage unit 12, the buffer memory 13, the decoder unit 14, the communication unit 19, and the input unit 20 are connected with one another via the bus 21. The control unit 11 is a computer including a CPU having an operational function, working RAM, ROM storing various sets of data and programs, and the like. The storage unit 12 includes a hard disk drive (HD), and the like, for storing various sets of data and programs. The storage unit 12 stores: the replicas of contents; the routing table using the DHT; the index information; and the content catalogue information. The buffer memory 13 temporarily stores the replicas of received contents, and the like. The decoder unit 14 decodes encoded video and audio data, and the like, included in the replica of the content. The term "decoding" means expansion and decryption of data, and the like. When the content data includes a movie or an audio, the decoder unit 14 decodes the video data or the audio data which is included in the content data. The video processing unit 15 processes the decoded video data, and the like, by a predetermined image processing and outputs the result as a video signal.

The display unit 16 is a CRT, a liquid-crystal display, and the like, which displays a video in accordance with a video signal output from the video processing unit 15. The audio processing unit 17 converts the decoded audio data into an analogue audio signal through digital to analogue (D/A) conversion, amplifies the signal by use of an amplifier, and outputs the amplified audio signal. The speaker 18 outputs, as sound waves, an audio signal output from the audio processing unit 17. The communication unit 19 controls communication of data with another node Nn, and the like, via the network 8. The input unit 20 receives a command from the user and gives a command signal to the control unit 11 in accordance with the command. The input unit 20 is, for example, a keyboard and mouse or a remote controller and operation panel, and the like. A personal computer, a Set Top Box (STB), a TV receiver, and the like, are applicable for the node Nn. The node Nn is disposed, for example, in a user's home, a Karaoke bar, a hotel, and the like.

The storage unit 12 has a cache area of storing content data. The cache area stores the acquired content data which is acquired from any of node devices, participating in the content distribution storage system S, or a management Server.

The storage unit 12 stores a cache list. The cache list includes a content name or the content ID which is stored in the cache area of the internal memory of each node. The content name or content ID corresponding to the content data is stored in the cache area. The cache area also stores check time indicative of the time when the record of content data is checked. The record of content data is checked when "process of checking stored content data" or transmitting process based on a request of transmitting the stored content data in the internal memory is executed.

The storage unit 12 also stores the IP address and node ID of the node device itself. The storage unit 12 also stores the "Range" as described above.

The storage unit 12 has a local catalogue information storage area, a newly published content catalogue information storage area and a retrieved result content catalogue information storage area. The local catalogue information storage area stores the local catalogue information. The newly published content catalogue information storage area stores the newly published content catalogue information. The retrieved result content catalogue information storage area stores the retrieved result content catalogue information.

In the control unit 11, the CPU reads a program, including a node processing program, stored in the storage unit 12, and the like, and executes the read program. As a result of execution of the program, an operation of the node is controlled in a centralized manner, whereby the control unit 11 performs processing of at least any one of the user node, a relay node, the root node, the cache node, and the content-holding node.

The node processing program may also be downloaded from a predetermined server located, for example, in the network 8. For example, the node processing program may also be recorded in a recording medium, such as a CD-ROM, and read via a driver for the recording medium.

(3. Process of Node Nn)

A process of node Nn is explained in detail using figures as follows.

3-1 Main Process of Node Nn

Figure 3:
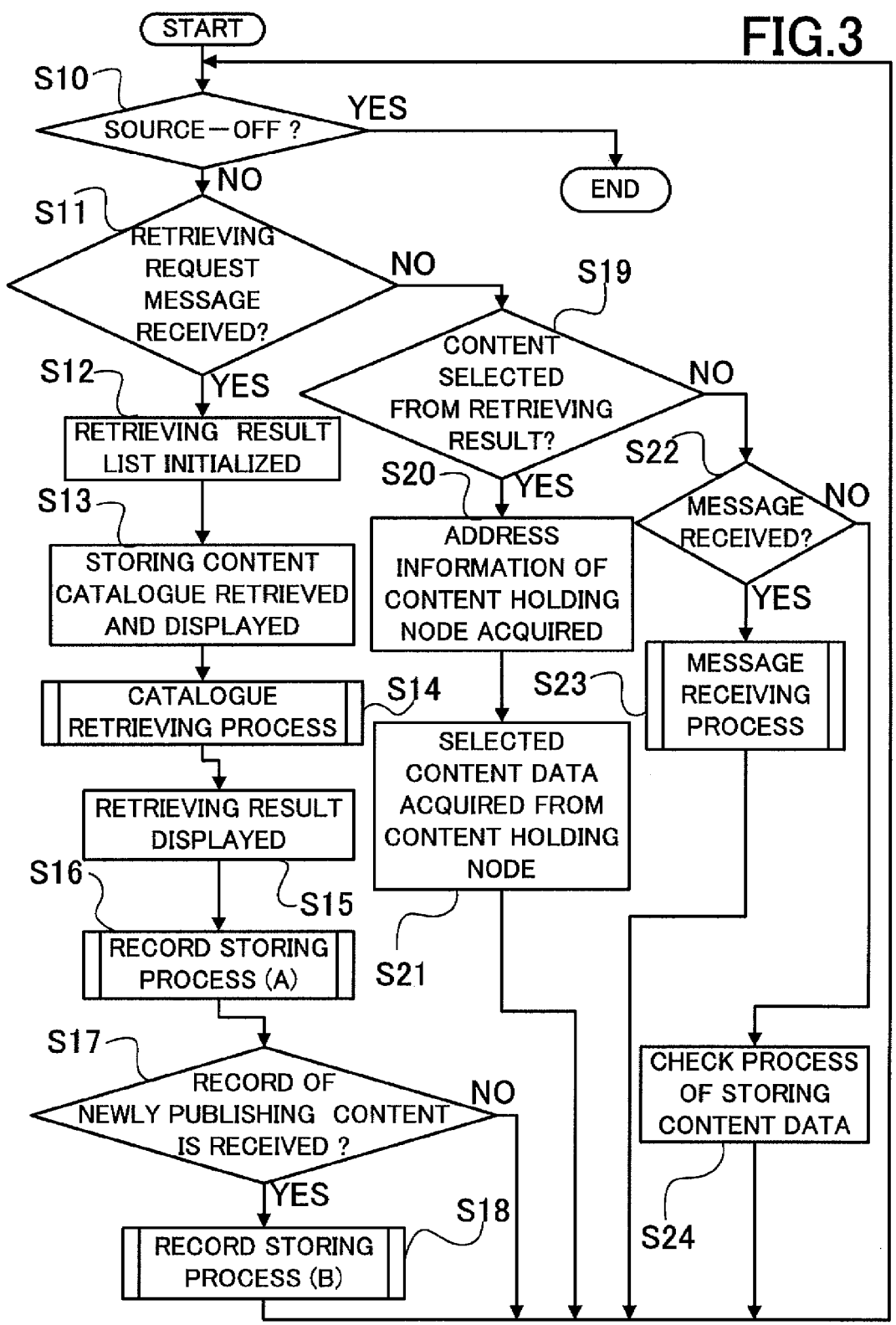
FIG. 3 is a flowchart showing exemplary processing of the controller unit 11 in the node Nn.

FIG. 3 illustrates a process flow chart of a main process of node Nn which participates in the content distribution storage system S. The main process is started after the node participated in the content distribution storage system S and read a node process program.

First, the controller unit 11 determines if an electric source of the node itself is OFF or not (Step S10). If the electric source is OFF (Step S10: Yes), the main process is finished. If the electric source is not OFF (Step S10: No), the controller unit 11 determines if the controller unit 11 receives a retrieving request of content, based on the predetermined rule (Step: S11). Concretely, for example, the controller unit 11 determines if the controller unit 11 receives the retrieving request of content which is inputted by the input device 20. A user of node operates the input device 20 and the user inputs a retrieving condition such as a key word or a publication period by the input device 20.

As a result of determination, the controller unit 11 receives the retrieving request (Step S11: Yes), the controller unit 11 initializes the storage area of "list of retrieved result" in RAM. The storage are of "list of retrieved result" is pre-set.

Next, the controller unit 11 retrieves the requested content in the stored content catalogue information. If the controller unit 11 can retrieve the requested content which meets the predetermined rule, the controller unit 11 instructs the display 16 to show a retrieved result (Step S13). The retrieved result of content is such as the record corresponding to the requested content. Then, the controller unit 11 stores the record in the storage area of the storage unit 12 as a retrieved result. In other words, the content which meets the predetermined rule is the retrieved content data. The retrieved result is, for example, the record of content data. In the step S13, the record of content data as the retrieved result is displayed to the user and the displayed record is registered in the retrieved result list.

Then, the controller unit 11 performs "Catalogue retrieving process" (Step S14). "Catalogue retrieving process" includes two steps. In a first step, the controller unit 11 transmits a retrieving request message, which includes a retrieving condition of the requested content, to another node Nn. Another node Nn receives the retrieving request message and retrieves in the local catalogue information, or the corresponding content catalogue information, based on the received retrieving request message. Another node Nn transmits the retrieved result of the received retrieving request message. In a second step, the node Nn which transmits the retrieving request message, receives the retrieving result. Detailed process of "Catalogue retrieving process", is described, for example, in US Patent Application Publication No. 2009/037445 A1, the entire contents of which are incorporated herein by reference.

In the step S14 of the catalogue retrieving process, another node Nn which receives the retrieving request message transfers the retrieved result and a record of the newly published content data to the node Nn which transfers the retrieving request message. Then, the controller unit 11 receives the transferred retrieved result and the record of the newly published content data. If another node Nn does not store the record of the newly published content data, another node Nn does not transfer the record of the newly published content data to the node Nn which transfers the retrieving request message.

In "Catalogue retrieving process" of the step 14, the controller unit 11 retrieves in the local catalogue information in the internal memory.

The controller unit 11 instructs the display 16 to show the retrieved result which is acquired from another node Nn (Step S15). The controller unit 11 also instructs the display 16 to show the retrieved result of the local catalogue information in the internal memory (Step S15).

The retrieved result, which is acquired by retrieving in the newly published content catalogue information storage area and the retrieved result content catalogue information storage area in the step S13, is registered in a list of the retrieved result. In step the S15, the retrieved result not registered in the list may be shown in the display 16 in order to prevent from showing the same retrieved result as that shown in step S13.

Then, the controller unit 11 performs a "retrieved result record storing process (A)" (Step S16). In the step S16, the record acquired as the retrieved result is stored in its internal memory. The "retrieved result record storing process (A)" is described as below in detail.

In the "catalogue retrieving process" of Step S14, the controller unit 11 determines if the controller unit 11 receives the record of the newly published content data from another node Nn (Step S17).

As a result of determination, the controller unit 11 performs the step S11, when the controller does not receive the record of the newly published content data (Step S 17: No). The controller unit 11 performs a "Record storing process (B)" (Step S 18), when the controller receives the record of the newly published content data (Step S 17: Yes). In the Step S18, the controller 11 stores the received record in its internal memory. The "retrieved result record storing process (B)" is described as below in detail.

In Step S11, the controller unit 11 determines that the controller unit 11 does not receive the retrieving request (Step S11: No), the controller unit 11 determines if at least one content is selected from the retrieved result which is shown in the display 16 in the step S13 or step S15 (Step S19).

Concretely, the controller unit 11 determines if at least one content is selected from the retrieved result in the display 16 by the input device 20 which is operated by the user.

As a result of determination, the controller unit 11 acquires the address information of the content holding node storing the selected content (Step S20), when the controller unit 11 determines at least one content which is selected in Step S19 (Step S19: Yes). Concretely, the controller unit 11 transmits the query to the root node storing the selected content, based on the content ID of the selected content. The root node storing the selected content receives the query and transmits the address information of the content holding node storing the selected content. Then, the unit controller 11 receives the address information of the content holding node of the selected content. After a predetermined time has passed, if the controller unit 11 can not acquire the address information of content holding node, the controller unit 11 inquires the address information to the management server. The controller unit 11 may acquire the address information of the selected content from management server.

Then, the controller unit 11 accesses the content holding node according to the acquired address information in the Step S18, and acquires the selected content data from content holding node (Step S21). The controller unit 11 stores the acquired content data in the cache area of the storage unit 12.

And the controller unit 11 stores relevant information of the acquired content data in the cache area. The controller unit 11 performs a registering process of content data, called "publish", in order to send to another node a message indicative of storing the content data. Detailed process of a "registering process of content data", are described, for example, in US Patent Application Publication No. 2009/037445 A1, the entire contents of which are incorporated herein by reference. The controller unit 11 performs the reproduction process of the acquired content data. The controller unit 11 performs the reproduction process and the processes from the Step S10 to the Step S24" in parallel.

If the controller unit 11 determines at least one content is not selected in the step S19 (Step S19: No), the controller unit 11 determines if the controller unit 11 receives the message from another node Nn or the management server (Step S22).

As a result of determination, the controller unit 11 determines the controller unit 11 receives the message (Step S22: Yes), the controller unit 11 performs a "message receiving process" (Step S23), and next performs Step S10. A detail of the "message receiving process" is explained below.

The controller unit 11 determines that the controller unit 11 does not receives the message (Step S22: No). The controller unit 11 performs a "check process of stored content data" (Step S24), and next performs step S10.

The stored content data checking process of the Step S24 is to check the stored content data in the content data cache area of the storage unit 12. For example, when the content data cache area stores a content data whose publication period through Internet has passed, the controller unit 11 deletes the content data. The record includes expiration data indicative of publication through Internet. The expiration data represents that the last day of publication through Internet. If the last day of the expiration data has passed from the present time, the controller unit 11 deletes the content data.

The controller unit 11 may transfer the pre-storing instruction message to another node Nn, according to a difference between present time and the first day for publication of the content data. In this case, the controller unit 11 determines if a timing of transferring the pre-storing instruction message to another node Nn has come based on the difference. The controller unit 11 transfers the pre-storing instruction message to another node Nn, when the controller unit 11 determines the timing of transferring. The controller unit 11 may update an order of priority for storing content data, when the controller unit 11 determines the order of priority, based on a fitness value or a degree of user's preference of content data. The fitness value is predetermined by the users or the viewing rate of the content data.

The stored content data check process is performed, based on the fitness value or the publication period which is included in the record. The controller unit 11 performs the stored content data check process to another node Nn through Internet, and to the local catalogue information, the newly published catalogue information, and the retrieving result catalogue information in its internal memory, when the controller unit 11 retrieves the record.

The controller unit 11 retrieves the required record in the local catalogue information and the newly publishing catalogue information and the retrieved result catalogue information, before retrieving the required record to another node Nn through Internet, in order to reduce a burden of the network.

In this embodiment, the pre-storing instruction message includes the content ID of the newly publishing content data. The record of newly published content data is more likely to be stored in the newly published catalogue information storage area of the storage unit 12. Retrieving the newly published catalogue information storage area prior to other retrieving method such as retrieving the local catalogue information and the retrieved result catalogue information helps to retrieve rapidly, when the controller unit 11 checks the publication period of content data in order to transfer the pre-storing instruction message to another node Nn in a multi-cast manner.

In Step S20, the controller unit 11 acquires the address information of the content holding node storing the required content data from the root node. The root node may transmit a content transmit request message indicative of the address information of the user node to the content holding node. In this case, the content holding node receives the content transmit request message. The content holding node transmits the requested content data to the user node. The user node may receive the requested content data described above.

Step S24 is the "check process of stored content data" step, as described above. In the Step S24, the controller unit 11 may not check the stored content data every time. Rather, the controller unit 11 may check the stored content data in the content data cache area at regular intervals. When the controller unit 11 checks the storing content data at regular intervals, the controller unit 11 may store a checking time in a check list of the storage unit 12 as last checked time. When the controller unit 11 stores the last checked time, the controller unit 11 may updates the last checked time.

In an embodiment of the invention, when the controller unit 11 retrieves the record according to the retrieving request in the Step S11, the controller unit 11 may retrieve the newly published catalogue information and the retrieved result catalogue information, prior to retrieving the local catalogue information in the Step S13. The controller unit 11 also may retrieve the local catalogue information prior to the newly published catalogue information and the retrieved result catalogue information. When executing the "catalogue retrieving process" at Step S11, the controller unit 11 may not retrieve the information from the local catalogue information. Nevertheless, in an embodiment of the invention, controller unit 11 retrieves information first in the local catalogue information, second in the newly published catalogue information, and finally in the retrieved result catalogue information.

The controller unit 11 may compare an amount of storage in the storage area, among the local catalogue information storage area, the newly published catalogue information storage area and the retrieving result catalogue information storage area. In an embodiment of the invention, the more the amount of the storage area is, the more prior the controller unit 11 retrieves in the storage area.

3-2. "Record Storing Process (A)"

Figure 4:
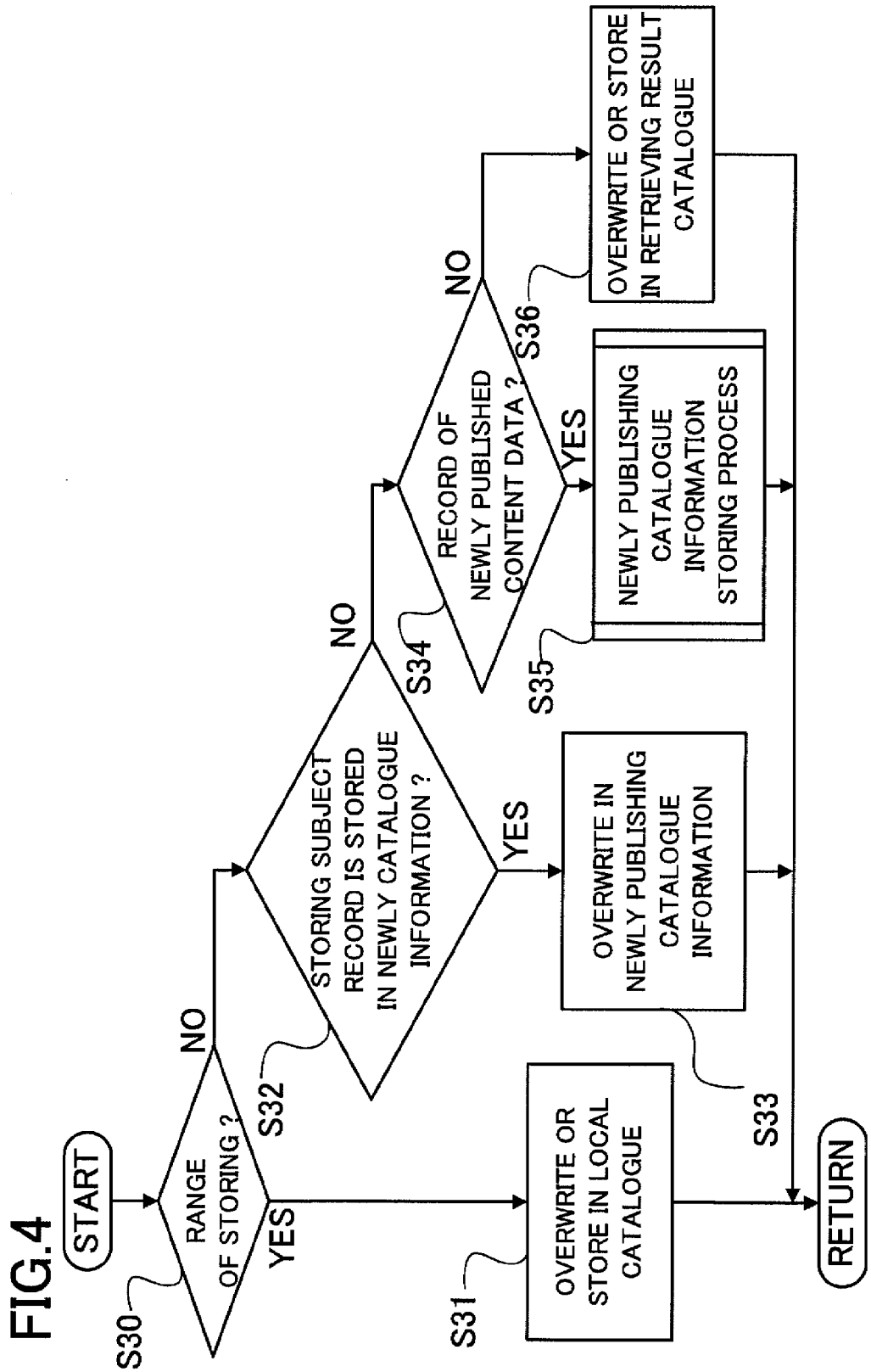
FIG. 4 shows a flow chart of "record storing process (A)" in step S16.

FIG. 4 illustrates a process flow chart of a "record storing process (A)," as shown in Step S16. The record storing process according to an embodiment of the invention may store the record, which is registered in the retrieved result list from one or more of the local catalogue information, the newly published catalogue information, and the retrieved result catalogue information.

As shown in FIG. 4, first, at Step S30, the controller unit 11 may determine if the record which is registered in the retrieved result list as a stored subject should be stored as a range to be stored in the internal memory, based on the "Range." Specifically, the controller unit 11 determines if the acquired record should be stored in the internal memory, based on its own "Range" and the node ID.

For example, when the "Range" equals 1 and the node ID is "0100", the controller unit 11 may determine that the record of the content ID having at least the highest digit of "0" may be stored in its internal memory as the range of storing. When the controller unit 11 determines that the record included in the received message in the step S42 should be stored as the range of storing, e.g., "YES" at Step S30, then controller unit 11 may store or overwrite the acquired record in the local catalogue information. If the acquired record has been stored in the local catalogue information, the controller unit 11 may overwrite the record in the local catalogue information.

Moreover, when the controller unit 11 determines that the record included in the received message in the step S42 should not be stored as the range of storing, e.g., "NO" at Step S30, then at Step S32, controller unit 11 determines if the acquired record is stored in the newly published catalogue information. When the acquired record is stored in the newly published catalogue information, e.g., "YES" at Step S32, then at Step S33, the controller unit 11 overwrites the acquired record in the newly published catalogue information, and finishes the record storing process (A). When the acquired record is not stored in the newly published catalogue information, e.g., "NO" at Step S32, then at Step S34, the controller unit 11 may determine if the acquired record is the record of the newly published content data. When the acquired record is the record of the newly published content data, e.g., "YES" at Step S34, then at Step S35, the controller unit 11 may perform a "newly published catalogue storing process" and finishes the record storing process (A).

When the acquired record is not the record of the newly published content data, e.g., "NO" at Step S34, then at Step S36, the controller unit 11 may store the acquired record in the retrieved result catalogue information. If the acquired record has been stored in the retrieved result catalogue information, the controller unit 11 may overwrite the acquired record in the retrieved result catalogue information and finishes the record storing process (A).

3-3. "Record Storing Process (B)"

Figure 5:
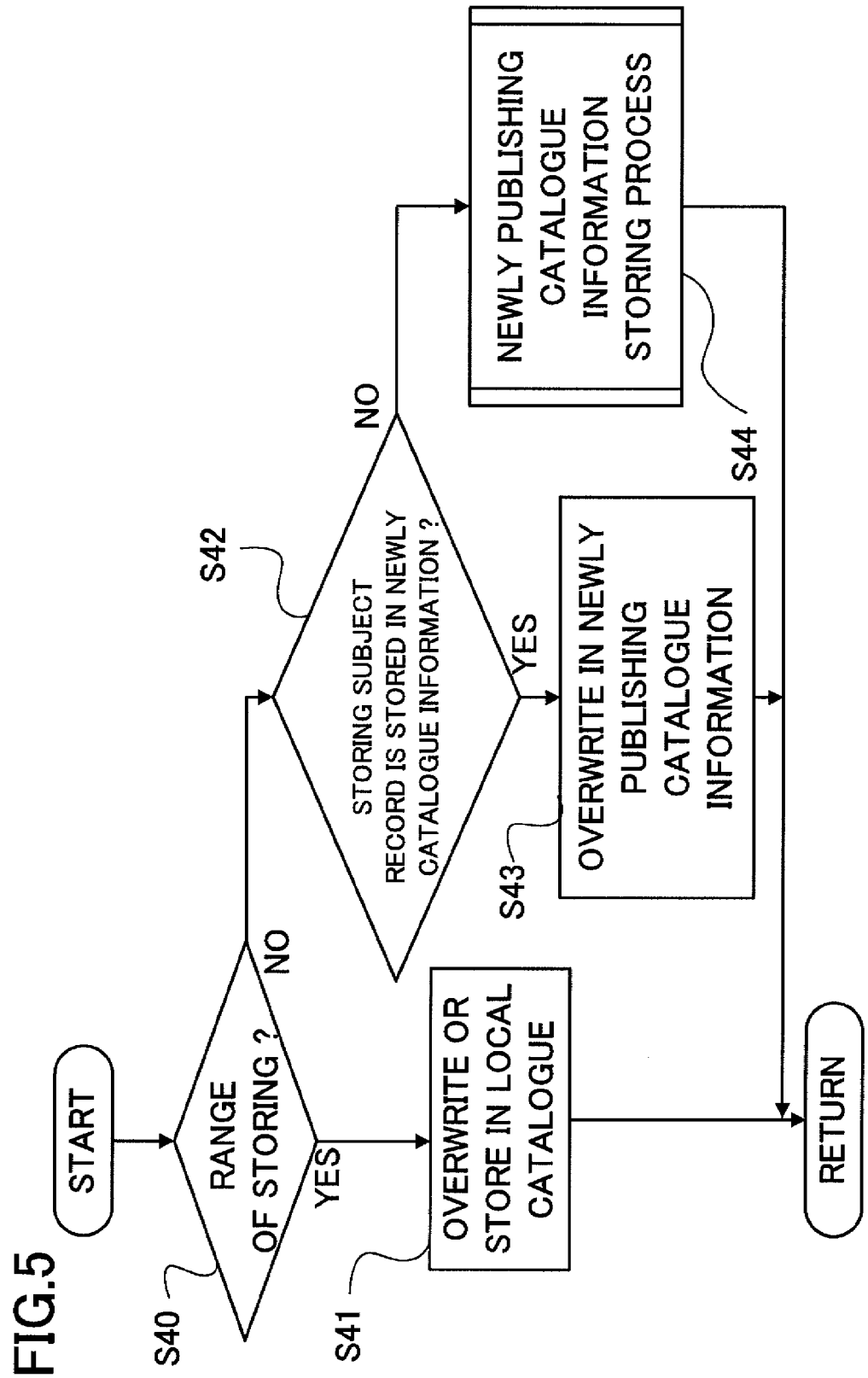
FIG. 5 shows a flow chart of "record storing process (B)" in step S18.

FIG. 5 illustrates a process flow chart of "record storing process (B)" of Step S18. The record storing process (B) may store the record of the newly published content data which is received with the retrieved result from another node Nn, e.g., through Internet, in one or more of the storage area of the local catalogue information, the newly published catalogue information, and the retrieved result catalogue information. The controller unit 11 may acquire the record of the newly published content data from another node Nn through Internet. The processes from the Step S40 to the Step S43 of the record storing process (B) are the same as the processes from the Step S30 to the Step S33 in the record storing process (A). When the acquired record is not stored in the newly published catalogue information, e.g., "NO" at Step S42, then at Step S44, controller unit 11 may perform the "newly published catalogue storing process," and finishes the record storing process (B). The "newly published catalogue storing process" is described in more detail herein.

3-4. "Newly Published Catalogue Storing Process"

Figure 6:
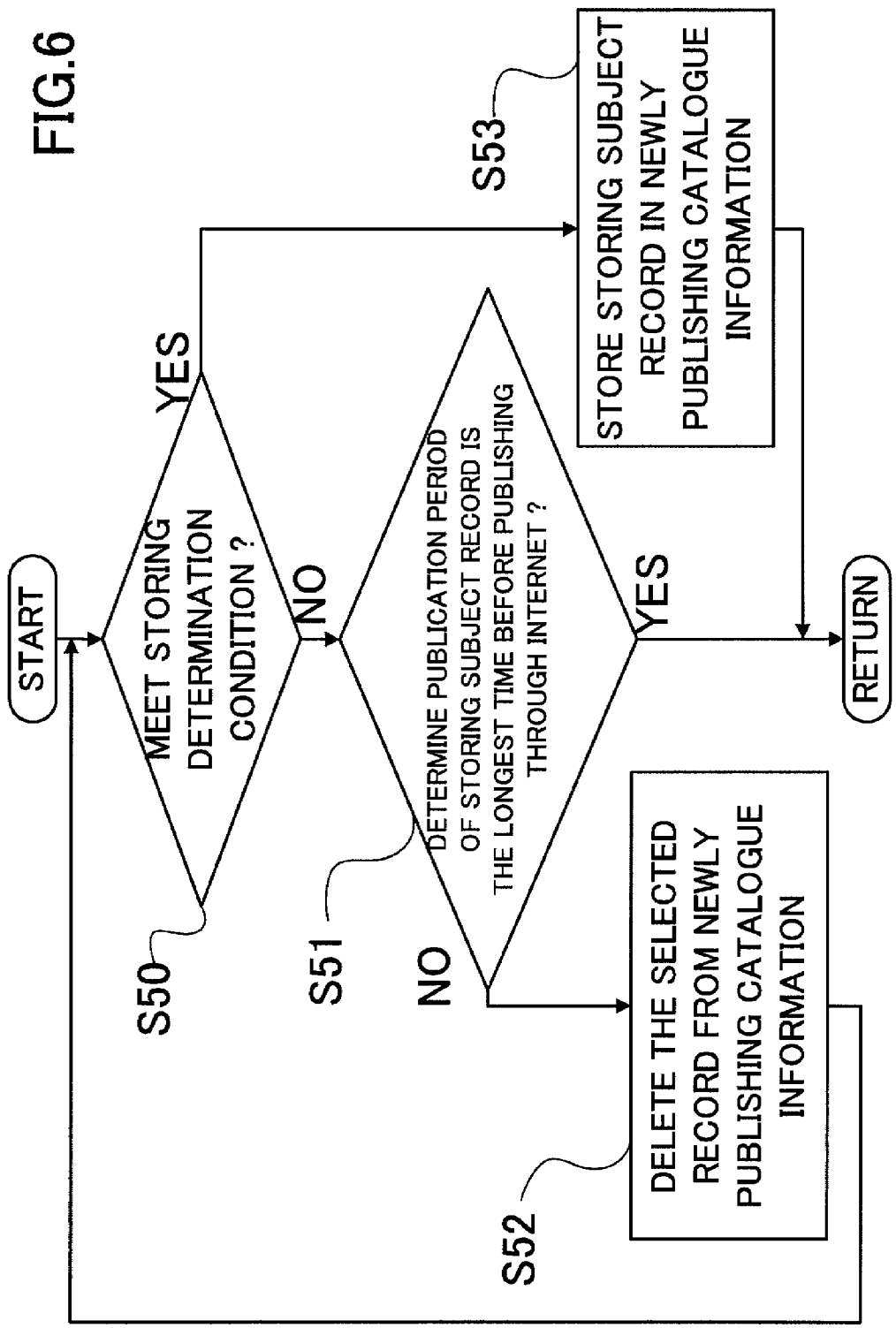
FIG. 6 shows a flow chart of "newly published catalogue storing process"

FIG. 6 illustrates a process flow chart of the "newly published catalogue storing process" as described above in the Step S35 of the record storing process (A), and in the Step S44 of the record storing process (B). When the controller unit 11 performs the newly published catalogue information of the record storing process (A) in Step S35, the controller unit 11 may determine the record which is registered in the list of the retrieved result as the stored subject record in the newly published catalogue information. When the controller unit 11 performs the newly published catalogue information of the record storing process (B) in the Step S44, the controller unit 11 may determine the record of the newly published content data which is received from another node Nn through Internet as the stored subject record in the newly published catalogue information.

First, at Step S50, the controller unit 11 may determine if a condition of storing determination is met. The condition of storing determination is to determine if the newly published catalogue information storage area has a sufficient amount of storing capacity for storing the storing subject record. For example, the condition of storing determination may be the number of the upper limit of the storing record in the newly published catalogue information storage area, or the condition of storing determination may be the amount of upper limit of storing capacity for the storing record in the newly published catalogue information storage area. The condition is predetermined by the management server or a system administrator. The condition is also predetermined according to the amount of storing capacity of the newly published catalogue information storage area.

When the controller unit 11 stores the storing subject record in the newly published catalogue information storage area, the controller unit 11 also may determine if the number of the storing record or the amount of storing capacity for the storing record in the newly published catalogue information storage area which has stored in the storing subject record is not more than the number of the upper limit of the storing record or the amount of the upper limit of storing capacity for the storing record. The controller unit 11 then determines whether the number of the storing record or the amount of storing capacity for the storing record in the newly published catalogue information storage area which has stored in the stored subject record is not more than the number of the upper limit of the storing record or the amount of the upper limit of storing capacity for the storing record. When the number is not more, then controller unit 11 determines the condition of storing determination is met. In an embodiment of the invention, each node Nn may be determined to be required to store the record of the newly published content data in the newly published catalogue information storage area. In this embodiment, the controller unit 11 determines the condition of storing determination is always met.

The controller unit 11 may continue to perform a deleting record process until the newly published catalogue information storage area has the data capacity of the stored subject record, when the data capacity of the stored subject record is more than the free space of the newly published catalogue information storage area.

When the controller unit 11 determines the condition of storing determination is not met, e.g., "NO" at Step S50, then controller unit 11 may compare the publication period, which is included in the record of the newly published catalogue information as a publication period information, with the publication period which is included in the stored subject record as a publication period information. Then, at Step S51, the controller unit 11 may determines if the publication period of the stored subject record has the longest time before the stored subject record is published through Internet.

To make this determination, first, the controller unit 11 may acquire present time information indicative of present time and may determine if a difference between the present time and the publication period of the stored subject record is more than a difference between the present time and the publication period of the record in the newly published catalogue information. If the difference between the present time and the publication period of the stored subject record is more than the difference between the present time and the publication period of the record in the newly published catalogue information, the controller unit 11 determines that the publication period of the stored subject record is the longest time before publishing through Internet.

When the controller unit 11 determines that the publication period of the stored subject record is the longest time before publishing through Interne, e.g., "YES" at Step S51, the controller unit 11 may determine that the stored subject record is not stored in the newly published catalogue information storage area, and may finish the newly published catalogue storing process. The stored subject record whose publication period is the longest time or relatively long time before publishing through Internet is more likely to be stored in the newly published catalogue information storage area at the other timing, except for the Step S52 or Step S53.

When the controller unit 11 determines the publication period of the stored subject record is not the longest time before publishing through Internet, e.g., "NO" at Step S50, then at Step S52, controller 11 may delete the record which has been stored in the newly published catalogue information storage area, and controller 11 may return to Step S50. The deleted record in the step S52 may be selected based on a predetermined rule. In an embodiment of the invention, the predetermined rule may be that the record whose publication period is the longest time before publishing through Internet is selected among the stored records in the newly published catalogue information storage area as a deleted record. The deleting process helps to store the stored subject record in the newly published catalogue information storage area steadily.

When the controller unit 11 determines the condition of storing determination is met, e.g., "YES" at Step S50, then at Step S53, the controller unit 11 stores the stored subject record in the newly published catalogue information storage area and finishes the newly published catalogue storing process.

In Step S52, according to an embodiment of the invention, one of the examples of the predetermined rule, is that the record, whose publication period is the longest time before publishing through Internet, may be selected among the stored records in the newly published catalogue information storage area as the deleted record. The record whose publication period is the past time from the present time may be selected as the deleted record. The record which has been published through Internet may be selected as the deleted record. When a plurality of records which have been published are stored in the newly published catalogue information storage area, a record for which the difference between the publication period of the record and the present time is the largest, may be selected as the deleted record.

The deleted record may be selected randomly in the newly published catalogue information storage area. The record for which the order of priority for storing content data is lower, may be selected in the newly published catalogue information storage area as the deleted record. The order of priority may be determined based on the fitness value, or on the degree of user's preference of content data. This process may be allowed to delete the record, which may be less affected, to retrieve the newly publishing catalogue information and to store the storing subject record in the newly publishing catalogue information consistently.

3-5. Message Receiving Process

Figure 7:
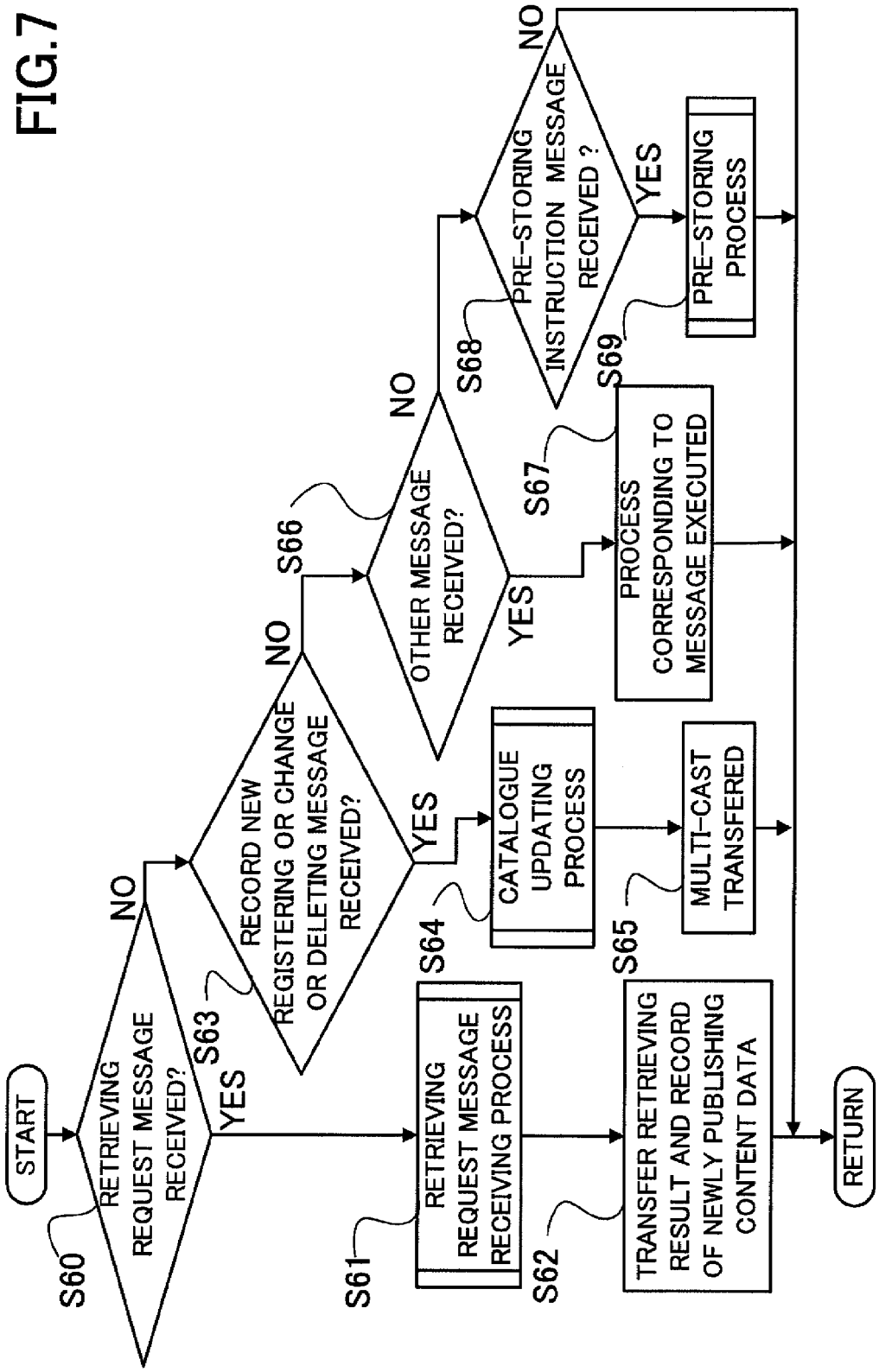
FIG. 7 shows a flow chart of "message receiving process" in the step S23.

FIG. 7 illustrates a process flow chart of a "message receiving process" as shown in the Step S23.

First, the controller unit 11 determines if the controller unit 11 receives a retrieving request message from another node Nn (Step S60). When the controller unit 11 determines that the controller unit 11 receives the retrieving message (Step S60 Yes), the controller unit 11 performs a "retrieving request message receiving process" (Step S61). In the "retrieving request message receiving process", the controller unit 11 retrieves an intended record in the local catalogue information and the newly published catalogue information and retrieved result catalogue information of the storage unit 12. Concretely, the controller unit 11 determines if the storage unit 12 stores a record corresponding to a content ID which is included in the retrieving request message or not. The controller unit 11 may retrieve in order of large memory capacity comparing the local catalogue information, the newly published catalogue information and the retrieved result catalogue information. Before the content data is published through Internet, each node Nn transfers the retrieving request message of the content data to another node Nn frequently. Therefore, retrieving in the newly published catalogue information prior to the local catalogue information and the retrieved result catalogue information enables the controller unit 11 to retrieve the required record rapidly. Detailed process of "retrieving request message receiving process", are described, for example, in US Patent Application Publication No. 2009/037445 A1, the entire contents of which are incorporated herein by reference.

The controller unit 11 transfers the retrieved result of the Step S61 and the record which is stored in the newly published catalogue information storage area to another node Nn which transfers the retrieving request message.

When the controller unit 11 determines the storage unit 12 does not store the record (Step S60: No), the controller unit 11 determines if the controller unit 11 receives any of a newly registering message, a change message, and a deleting message of the record from another node Nn or the management server or not (Step S63). The newly registering message is sent by the management server in a multi-casted manner, when the management server throws a new content in the content distribution storage system S. The change message is sent by the management server in a multi-casted manner, when the management server changes the record which has been thrown in the content distribution storage system S. The deleting message is sent by the management server in a multi-casted manner, when the management server deletes the record which has been thrown in the content distribution storage system S. These messages as described above are sent to all nodes Nn which participate in the content distribution storage systems S by the management server in a multi-cast manner, based on a predetermined rule.

In some cases, the management server sends these messages to all nodes Nn in the content distribution storage system S. In other cases, the management server sends these messages to the node Nn which participates in content distribution storage system S based on a predetermined rule. Then the node Nn which receives these messages from the management server transfers the received messages to another node Nn using DHT routing table. As a result of transferring, these messages sent by management server are sent to all nodes Nn in a multi-cast manner. In this embodiment, the latter case is applied, namely, the management server sends the messages to the node Nn which participates in content distribution storage system S based on a predetermined rule.

As a result of determination in Step S63, when the controller unit 11 determines the node Nn receives any of the newly registering message, the change message, and the deleting message (Step S63: Yes), the controller unit 11 performs a "catalogue updating process" (Step S64). A detailed process of Step S64 is explained below.

After updating the content catalogue, the controller unit 11 transfers any of the newly registering message, the change message, and the deleting message to another node Nn in a multi-casted manner (Step S65) and finishes the message receiving process.

Then, the controller unit 11 determines if the controller 11 receives any of the content retrieving message (query), the content registering message (publish), the content deleting message and the content storing request message from another node Nn or not (Step S66).

As a result of determination, when the controller unit 11 determines the controller unit 11 receives any of the content sending request message, the content retrieving message (query), the content registering message (publish), the content deleting message and the content storing request message (Step S66: Yes), the controller unit 11 performs a process corresponding the received message (Step S67) and finishes the "message receiving process". When the controller unit 11 receives the content sending request message, the controller unit 11 sends content data corresponding to the content ID which is included in the content sending message in the storage unit 12. When the controller unit 11 receives the content retrieving message, the controller 11 determines if the storage unit 12 stores the index information of content holding node corresponding to content ID which included in the content retrieving message or not. When the storage unit 12 stores the index information, the controller unit 11 sends the index information which includes the address information of content holding node to a node Nn which sends the content retrieving message. When the controller unit 11 receives the content storing request message from the management server, the controller unit 11 acquires the content data corresponding to the content ID which is included in the content storing message and stores the acquired content data in the cache area. As described above, according to the received message, the controller unit 11 performs a function of any of the transferring node, the root node, and the content holding node.

When the controller unit 11 acquires the content data corresponding to the content ID which is included in the content sending request message from the content data cache area of the storage unit 12 and sends the acquired content data, the controller unit 11 checks if a time limit for publishing the content data through Internet, has passed in reference to the local catalogue information and the newly published catalogue information and the retrieved result catalogue information in the storage unit 12. Then, the controller unit 11 sends a content data the time limit of which has not passed. If there is no record of the content data which is sent in the local catalogue information and the newly published catalogue information and the retrieved result catalogue information of the storage unit 12, the controller unit 11 performs the "catalogue retrieving process" and checks the time limit based on the acquired record from another node Nn. The process prevents from sending a content data the time limit of which has passed.

When the controller unit 11 checks the time limit, the controller unit 11 stores time of checking the time limit corresponding to the content ID in a check list of the storage unit 12 as last check time. When the controller unit 11 stores the last check time, if the last check time has been stored in the check list of storage unit 12, the controller unit 11 updates the last check time.

As a result of determination, when the controller unit 11 determines the controller unit 11 does not receive any of the content retrieving message (query), the content registering message (publish), the content deleting message and the content storing request message (Step S66: No), the controller unit 11 determines if the pre-storing instruction message from another node Nn or the management server (Step S68).

When the controller unit 11 does not receive the pre-storing instruction message (Step S68: No), the controller unit 11 finishes the message receiving process. When the controller unit 11 receives the pre-storing instruction message (Step S68: Yes), the controller unit 11 performs a "pre-storing process" (Step S69) and finishes the message receiving process. A detailed process of the pre-storing process is described below.

In the Step S62, the controller unit 11 transfers the stored record in the newly published catalogue information storage area to another node Nn which transfers the retrieving request message. A retrieving result transferring message which is sent in the Step S62 has little storage area of storing the record, the controller unit 11 may not transfer the retrieved result transferring message which is included in the record to another node Nn.

For example, the newly published catalogue information storage area stores ten records and the retrieved result transferring message can store one-hundred records. If the records of the retrieved result are ninety-five records, the retrieved result transferring message can store five records. Then, the controller unit 11 abstracts five records from the newly published catalogue information storage area. The controller unit 11 stores ninety-five records of retrieved result and five abstracted records in the retrieved result transferring message. When the controller unit 11 abstracts five records from the newly published catalogue information storage area, the controller unit 11 abstracts in order of the latest publication period from the present time.

3-6. Catalogue Update Process

Figure 8:
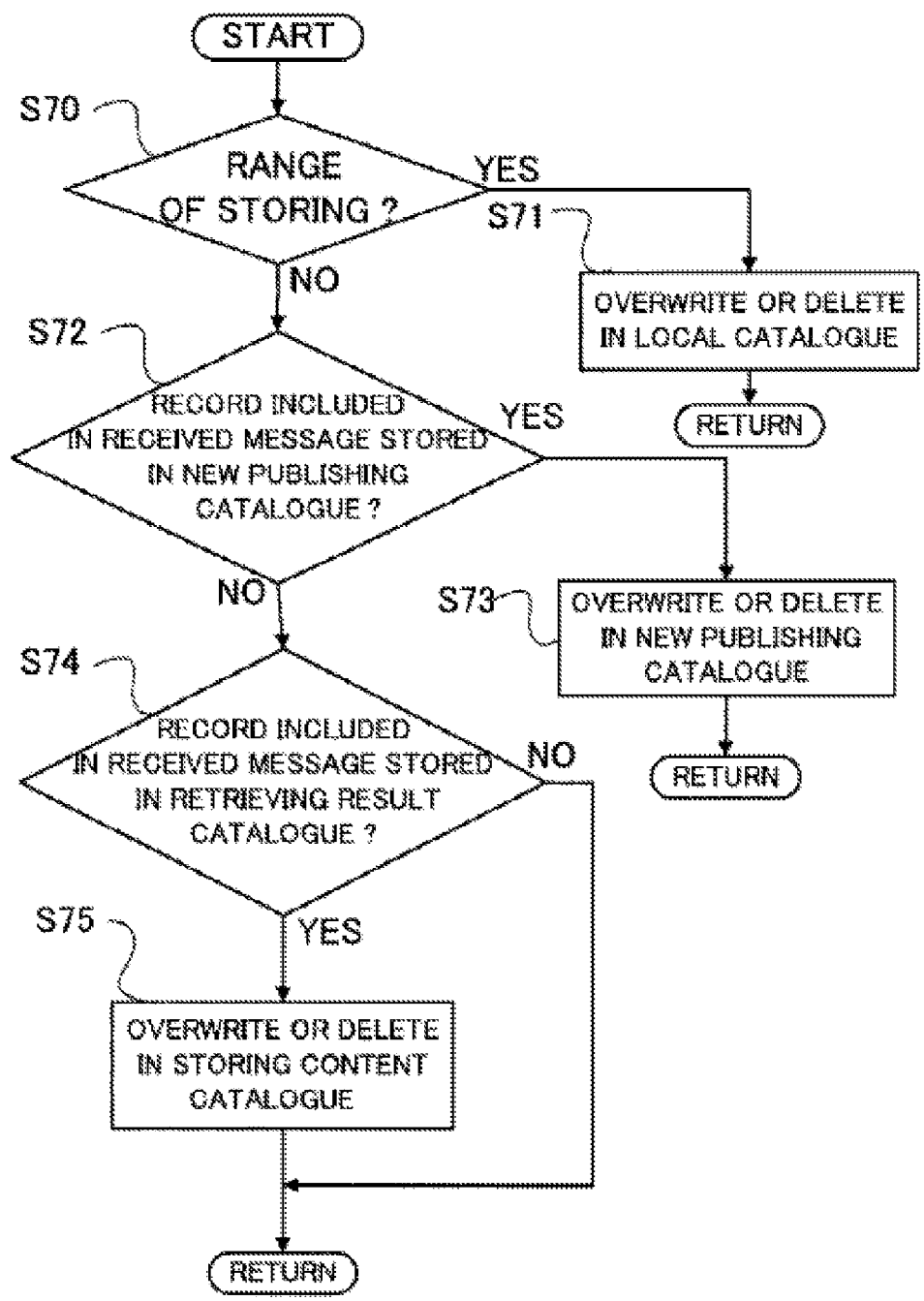
FIG. 8 shows a flow chart of "message receiving process" in the step S64.

FIG. 8 illustrates a process flow chart of a "message receiving process" as shown in the Step S64.

First, the controller unit 11 determines if the record included in the received message in the Step S63 should be stored as a range of storing in the internal memory or not, based on the "Range" (Step S70). The detailed process of the Step S70 is the same process of the Step S30.

As a result of determination, when the controller unit 11 determines that the record included in the received message should be stored as the range of storing (Step S70: Yes), the controller unit 11 stores or overwrites the received record in the local catalogue information, or deletes the received record from the local catalogue information, and after storing or overwriting or deleting, the controller unit 11 finishes the catalogue update process.

In the Step S71, if the received message is the newly registering message, the newly registering message includes the newly registering record. And the controller unit 11 stores the newly registering record in the local catalogue information. In the Step S71, if the received message is the change message, the change message includes the change record and the controller unit 11 overwrites the change record in the local catalogue information. In the Step S71, if the received message is the deleting message, the deleting message includes the deleting record and the controller unit 11 deletes the deleting record from the local catalogue information.

As a result of determination, when the controller unit 11 determines that the record included in the received message should not be stored as the range of storing (Step S70: No), the controller unit 11 determines if the record included in the received message is stored in the newly published catalogue information or not (Step S72).

As a result of determination, the controller unit 11 determines that the record included in the received message is stored in the newly published catalogue information (Step S72: Yes), the controller unit 11 overwrites or deletes the record in the newly published catalogue information, based on the record included in the received message (Step S73), and finishes "catalogue updating process".

As a result of determination of the Step S72, the controller unit 11 determines that the record included in the received message is not stored in the newly published catalogue information (Step S72: No), the controller unit 11 determines if the record which is included in the received message is stored in the retrieved result catalogue information storage area (Step S74).

As a result of the determination, the controller unit 11 determines the record which is included in the received message is not stored in the retrieved result catalogue information storage area (Step S74: No), the controller unit 11 finishes the catalogue update process. The controller unit 11 determines the record which is included in the received message is stored in the retrieved result catalogue information storage area (Step S74: Yes), the controller unit 11 overwrites the record in the retrieved result catalogue information or deletes the record from the retrieved result catalogue information, based on the record which is included in the received message (Step S75), and finishes the catalogue update process.

3-7. Pre-Storing Process

FIG. 9 illustrates a process flow chart of the "pre-storing process" of Step S69. The pre-storing process may acquire the content data which is instructed by the pre-storing instruction message in Step S68 and may store the acquired content data in the content data cache area of the storage unit 12. First, at Step S80, the controller unit 11 determines if the newly published catalogue information storage area stores the record of instructed content data by the pre-storing instruction message. For example, the pre-storing instruction message may comprise a content name or content ID of an intended content data. The controller 11 determines whether the newly published catalogue information stores the content data corresponding to the content name or content ID, which is included in the pre-storing instruction message.

When the controller unit 11 determines the newly published catalogue information storage area does not store the record of instructed content data by the pre-storing instruction message, e.g., "NO" at Step S80, then at Step S81, controller unit 11 may determine if the local catalogue information storage area and the retrieved result catalogue information storage area store the record of the instructed content data.

When the controller unit 11 determines the local catalogue information storage area or the retrieved result catalogue information storage area does not store the record of the instructed content data, e.g., "NO" at Step S81, then at Step S82, controller unit 11 may perform the catalogue retrieved result. The controller unit 11 may retrieve the record of the instructed content data from the newly published catalogue information or the local catalogue information or the retrieved result catalogue information of another node Nn, e.g., through Internet. Another node Nn may transfer the retrieved result to the retrieving node Nn. In the catalogue retrieving result of Step S 82, the controller unit 11 may not retrieve in the local catalogue information.

When the controller unit 11 determines the newly published catalogue information storage area stores the record of instructed content data by the pre-storing instruction message, e.g., "YES at Step S80, the controller unit 11 may acquire the record of the instructed content data by the pre-storing instruction message from the newly published catalogue information storage area.

When the controller unit 11 determines the local catalogue information storage area and the retrieved result catalogue information storage area store the record of the instructed content data, e.g., "YES" at Step S81, then controller unit 11 may acquire the record of the instructed content data by the pre-storing instruction message from the local catalogue information storage area or the retrieved result catalogue information storage area.

Next, at Step S83, the controller unit 11 may acquire address information of the content holding node which stores the instructed content data by the pre-storing instruction message. Specifically, in an embodiment of the invention, the controller unit 11 may extract the content ID from one or more of the records acquired in Step S80, the record acquired in Step S81, and the record acquired at Step S82. The controller unit 11 may transfer the query to another node Nn based on the extracted content ID. Then the root node of the extracted content ID receives the query. The root node transfers the address information of the content holding node of the extracted content ID to the node Nn which transfers the query. If the controller unit 11 does not receive the address information from the root node after a predetermined time has passed since the controller unit 11 transfers the query to another node Nn, then the controller unit 11 accesses the management server. The controller unit 11 then may acquire the address information of the content holding node of the instructed content data from the management server.

At Step S84, the controller unit 11 may access the content holding node according to the acquired address information, and may acquire the instructed content data from the content holding node. After the controller unit 11 acquires the instructed content data, the controller unit 11 transfers the content registering message, e.g., "publish," of the instructed content data to another node Nn. The process of transferring the content registering message is the same process as described with respect to Step S21. In the Step S21, the controller unit 11 may output the acquired content data using the display 16 or the speaker 18. In the Step S84, however, the controller unit 11 may acquire the newly published content data. Then, the controller unit 11 does not output.

The controller unit 11 then, at Step S85, may perform the record storing process (B). The controller unit 11 stores the record of the instructed content data in one or more of the local catalogue information storage area, the newly published catalogue information storage area, and the retrieved result catalogue information storage area. After performing the step S85, the controller unit 11 finishes the pre-storing process.

When the pre-storing instruction message includes the content ID of the instructed content data, the controller unit 11 does not perform between the Step S80 and the Step S82. In this case, the controller unit 11 may transfer the query to another node Nn, based on the included content ID. The controller unit 11 acquires the record of the instructed content data and may store the acquired record in one or more of the local catalogue information storage area, the newly published catalogue information storage area, and the retrieved result catalogue information storage area in the step S85. Then, the controller unit 11 retrieves the record from one of these areas, and acquires the record.

The controller unit 11 may determines the record of the instructed content data is stored in the Step S80 or the Step S81, the controller unit 11 may not perform the record storing process (B).

As described above, in this embodiment, the node Nn stores not only the record of the range of storing in the local catalogue information storage area but also storing the record of the newly published content data in the newly published catalogue information storage area. When the controller unit 11 performs the catalogue retrieved result, the controller unit 11 can refer to the newly published catalogue information storage area. Referring to the newly published catalogue information storage area without through Internet helps to retrieve quickly.

The node Nn determines if the stored subject record is included in the range of the storing in the Step S30 or Step S40. Only when the node Nn determines the stored subject record is not included in the range of the storing, the node stores the stored subject record in the newly published catalogue information ore the retrieved result catalogue information. This process prevents from storing the stored subject record both in the local catalogue information and in the newly published catalogue information, redundantly. This process also prevents from storing the stored subject record both in the local catalogue information and in the retrieved result catalogue information, redundantly.

When the management server transfers the record of the newly published content data as the message to each node Nn in a multi-cast manner, the node Nn may not operate or receive the message. In this embodiment, the node Nn can transfer the retrieved result and the record of the newly published content data to another node Nn which transfers the retrieving request message in the Step S62. Each node Nn can transfer and receive the record of the newly published content data with the retrieved result among a plurality of nodes Nn. Transferring and receiving the record of the newly published content data is allowed to store the record of the storing range without omission. Although, the record of the newly published content data, which can not be stored in the newly published catalogue information storage area, is not the range of storing, each node Nn can transfer and receive the not-stored record among a plurality of nodes Nn. Transferring and receiving the not-stored record is allowed to store the not-stored record in the newly published catalogue information storage area.

The record which is stored in the content data cache area of the storage unit 12 may be stored in a stored content data catalogue information storage area of the storage unit 12. In this case, when the node Nn checks the publication period of the content data or transfers the stored content data in the content data cache area to another node Nn, the node Nn can retrieve in the stored content data catalogue information storage area prior to in the local catalogue information storage area or the newly published catalogue information storage area or the retrieved result catalogue information storage area. Retrieving in the stored content data catalogue information storage area prior to in the local catalogue information storage area or the newly published catalogue information storage area or the retrieved result catalogue information storage area helps to check quickly.

The stored content data catalogue information storage area may have the same storage capacity as the local catalogue information storage area or the newly published catalogue information storage area or the retrieved result catalogue information storage area. The storage capacity of the stored content data catalogue information storage area may be 100 MB, that of the local catalogue information storage area or the newly published catalogue information storage area may be 50 MB and that of the retrieved result catalogue information storage area may be 30 MB. If the storage capacity of the stored content data catalogue information is more than the other storage capacity, the record which is stored in the content data cache area is stored in the storage unit 12 certainly. If the storage capacity of the newly published catalogue information storage area is more than that of the local catalogue information storage area, the newly published catalogue information storage area can store a lot of the newly published records which are more likely to be retrieved than the other catalogue information storage area.

When the content data is stored in the content data cache area of the storage unit 12, the node may acquire the record of the content data and store the acquired record in the stored content data catalogue information storage area.

The content distribution storage system S of this embodiment uses the DHT routing table. However, the present invention is not limited to this embodiment The content distribution storage system S may use other routing table which includes the node information. In this embodiment, the content distribution storage system S is applied to a P2P (peer-to-peer) system of so-called pure type utilizing DHT. This invention may also be applied to another P2P system. For example, in a P2P system of so-called hybrid type, such as a Napster, contents are stored in respective node devices in a distributed manner; however, locations of the contents are managed by a server.

What is claimed is:

1. A node device configured to communicate with a plurality of other node devices via a network as part of an information communication system, the node device comprising:
    a memory configured to store first content data, first catalogue information that includes a first predetermined value that identifies the node device for storing the first content data in the memory, second catalogue information that includes a second predetermined value that identifies one or more of the plurality of the other node devices for storing second content data, and third catalogue information; and
    a processor configured to execute computer-readable instructions to cause the node device to:
        receive catalogue information comprising at least one of the first catalogue information and the second catalogue information, in combination with publication time information corresponding to a time that the first content data or the second content data was published in the network, respectively;
        apply a predetermined rule to determine whether the catalogue information received by the node device includes at least one of the first predetermined value and the second predetermined value;
        determine whether the catalogue information received by the node device is newly published in the network based on the publication time information received with that catalogue information;
        store the catalogue information received by the node device as the first catalogue information in the memory when the catalogue information received by the node device includes the first predetermined value;
        store the catalogue information received by the node device as the second catalogue information in the memory when the catalogue information received by the node device includes the second predetermined value;
        store the catalogue information received by the node device as the third catalogue information in the memory when the catalogue information received by the node device is determined to be newly published; and
        search at least one of the first catalogue information and the third catalogue information stored in the memory for the first content data and the second content data prior to searching the second catalogue information stored on the memory.

2. The node device according to claim 1, wherein the processor is configured to store the second catalogue information in the memory when the catalogue information received by the node device currently is not stored in the memory.

3. The node device according to claim 1, wherein:
    the processor is configured to obtain present time information corresponding to a present time information,
    determining whether the catalogue information received by the node device is newly published in the network comprises determining whether a difference between the publication time information and the present time information is less than a third predetermined value, and
    when the difference is less than the third predetermined value, storing the catalogue information received by the node device as the third catalogue information in the memory, including the publication time information.

4. The node device according to claim 1, wherein the processor is configured to:
    determine whether the memory has a sufficient storage area for storing the third catalogue information; and
    delete at least one of the first catalogue information, the second catalogue information, and the third catalogue information currently stored in the memory based on a predetermined rule when the processor determines the memory does not have the sufficient storage area for storing the third catalogue information.

5. The node device according to claim 4, wherein the processor is configured to:
    to obtain present time information corresponding to a present time;
    determine a difference between the publication time information in the third catalogue information and the present time information; and
    delete the third catalogue information currently stored in the memory in order from the third catalogue information having a greater difference to the catalogue information having a lesser difference.

6. The node device according to claim 5, wherein the processor is configured to delete the third catalogue information currently stored in the memory when the publication time information is prior to the present time information, in order from the third catalogue information having a greatest difference to the third catalogue information having a least difference.

7. The node device according to claim 5, wherein the processor is configured to delete the third catalogue information currently stored in the memory when the publication time information is later than the present time information, in order from the catalogue information having the greater difference to the catalogue information having the lesser difference.

8. The node device according to claim 1, wherein a greater amount of storage capacity in the memory is allocated to the third catalogue information than to the first catalogue information.

9. The node device according to claim 1, wherein the processor is configured to store identification information in the memory, the identification information comprising information that identifies one node device from among the node device and the plurality of the other node devices on which the identification information is stored,
    wherein the predetermined rule applied by the processor to determine whether the catalogue information received by the node device includes at least one of the first predetermined value and the second predetermined value is based on a comparison result between the identification information and the catalogue information received by the node device.

10. The node device according to claim 9, wherein:
the identification information received by the node device comprises at least one number;
the catalogue information received by the node device comprises at least one number; and
for each of the catalogue information received by the node device, the predetermined rule applied by the processor to determine whether the catalogue information received by the node device includes at least one of the first predetermined value and the second predetermined value is also based on a comparison result of whether the at least one number of the identification information corresponds with the at least one number of the catalogue information received by the node device.

11. The node device according to claim 10, wherein the predetermined rule applied by the processor to determine whether the catalogue information received by the node device includes at least one of the first predetermined value and the second predetermined value is based on a comparison result of whether a high rank digit of the at least one number of the identification information corresponds with a high rank digit of the at least one number of the catalogue information received by the node device.

12. A computer program product comprising a non-transitory computer readable medium having computer readable instructions stored thereon, the computer readable instructions configured to be executed by a processor in at least one node device of a plurality of node devices connected via a network in an information communication system in which content data is stored in the at least one node device and is accessible from the other of the plurality of the node devices, the computer program product causing the processor to perform steps comprising:
receiving catalogue information comprising at least one of first catalogue information that includes a first predetermined value that identifies the at least one node device for storing first content data in a memory of the at least one node device and second catalogue information that includes a second predetermined value that identifies one or more of the plurality of the node devices for storing second content data, in combination with publication time information corresponding to a time the first content data or the second content data was published, respectively;
applying a predetermined rule to determine whether the received catalogue information includes at least one of the first predetermined value and the second predetermined value;
determining whether the received catalogue information is newly published based on the publication time information received with that catalogue information;
storing the received catalogue information as first catalogue information in the memory of the at least one node device when the received catalogue information includes the first predetermined value;
storing the received catalogue information as second catalogue information in the memory of the at least one node device when the received catalogue information includes the second predetermined value;
storing the received catalogue information as third catalogue information in the memory of the at least one node device when the received catalogue information is determined to be newly published; and
searching at least one of the first catalogue information and the third catalogue information stored in the memory for the first content data and the second content data prior to searching the second catalogue information stored on the memory.

13. A method for retrieving content data in an information communication system in which a plurality of node devices are connected via a network and communicate with each other, the content data being stored in a memory of at least one node device of the plurality of the node devices and being accessible from other node devices of the plurality of the node devices, the method comprising the steps of:
receiving catalogue information comprising at least one of first catalogue information that includes a first predetermined value that identifies the at least one node device for storing the first content data in the memory and second catalogue information that includes a second predetermined value that identifies one or more of the other node devices for storing second content data, in combination with publication time information corresponding to a time that the first content data or the second content data was published, respectively;
applying a predetermined rule to determine whether the received catalogue information includes at least one of the first predetermined value and the second predetermined value;
determining whether the received catalogue information is newly published based on the publication time information received with that catalogue information;
storing the received catalogue information as first catalogue information in the memory of the at least one node device when the received catalogue information includes the first predetermined value;
storing the received catalogue information as second catalogue information in the memory of the at least one node device when the received catalogue information includes the second predetermined value;
storing the received catalogue information as third catalogue information in the memory when the received catalogue information is determined to be newly published; and
searching at least one of the first catalogue information and the third catalogue information stored in the memory for the first content data and the second content data prior to searching the second catalogue information stored on the memory.

14. An information communication system comprising:
a first device comprising:
a first memory configured to store first content data, first catalogue information, second catalogue information, and third catalogue information, wherein the first catalogue information includes a first predetermined value that identifies the first device for storing the first content data in the first memory;
a first processor configured to execute first computer-readable instructions to cause the first device to perform as a first node in the information communication system;
a second device comprising:
a second memory configured to store second content data, the first catalogue information, the second catalogue information, and the third catalogue information, wherein the second catalogue information includes a second predetermined value that identifies the second device for storing the second content data in the second memory;
a second processor configured to execute second computer-readable instructions to cause the second device to perform as a server or a second node in the information communication system, wherein the first processor executes the first computer-readable instructions to:

receive catalogue information comprising at least one of the first catalogue information and the second catalogue information, in combination with publication time information corresponding to a time that the first content data or the second content data was published, respectively, in the information communication system;

apply a predetermined rule to determine whether the catalogue information received by the first device includes at least one of the first predetermined value and the second predetermined value;

determine whether the catalogue information received by the first device is newly published in the information communication system, based on the publication time information received with that catalogue information;

store the catalogue information received by the first device as the first catalogue information in the first memory when the catalogue information received by the first device includes the first predetermined value;

store the catalogue information received by the first device as the second catalogue information in the first memory of the first device when the catalogue information received by the first device includes the second predetermined value;

store the catalogue information received by the first device as the third catalogue information in the first memory of the first device when the catalogue information received by the first device is determined to be newly published; and search at least one of the first catalogue information and the third catalogue information stored in the first memory for the first content data and the second content data prior to searching the second catalogue information stored on the first memory.

15. The information communication system according to claim 14, wherein:

the second processor is configured to execute the second computer-readable instructions to cause the second device to perform as the server in the information communication system; and the information communication system further comprises at least one third device comprising:

a third memory configured to store the second content data, the first catalogue information, the second catalogue information, and the third catalogue information; and a third processor configured to execute third computer-readable instructions to cause the at least one third device to perform as at least one second node in the information communication system.

16. The information communication system according to claim 15, wherein the second processor executes the second computer-readable instructions to transmit the first catalogue information, the second catalogue information, and the third catalogue information to the first device and the at least one third device.

* * * * *